(12) United States Patent
Wakutsu

(10) Patent No.: US 8,170,520 B2
(45) Date of Patent: May 1, 2012

(54) SEMICONDUCTOR INTEGRATED CIRCUIT DEVICE PROVIDED WITH FM RECEIVING FUNCTION

(75) Inventor: Takashi Wakutsu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 537 days.

(21) Appl. No.: 12/401,167

(22) Filed: Mar. 10, 2009

(65) Prior Publication Data

US 2009/0233569 A1 Sep. 17, 2009

(30) Foreign Application Priority Data

Mar. 13, 2008 (JP) .................................. 2008-064240

(51) Int. Cl.
*H04B 1/10* (2006.01)
(52) U.S. Cl. ........................................ 455/296; 455/304
(58) Field of Classification Search .................. 327/296, 327/226.1, 297, 307; 455/296, 226.1, 297, 455/302–307; 370/338
See application file for complete search history.

(56) References Cited

U.S. PATENT DOCUMENTS

| 7,269,237 B2 * | 9/2007 | Taira | 375/346 |
| 7,729,680 B2 * | 6/2010 | Gozen | 455/296 |
| 7,839,334 B2 * | 11/2010 | Rofougaran | 343/700 MS |
| 2005/0058296 A1 * | 3/2005 | Karasudani | 381/13 |

FOREIGN PATENT DOCUMENTS

| JP | 2000-174652 | 6/2000 |
| JP | 2000-332666 | 11/2000 |
| JP | 2002-374179 | 12/2002 |
| JP | 2003-168991 | 6/2003 |
| JP | 2004-236171 | 8/2004 |
| JP | 2004-304670 | 10/2004 |
| JP | 2006-165738 | 6/2006 |

* cited by examiner

*Primary Examiner* — Dinh T. Le
(74) *Attorney, Agent, or Firm* — Oblon, Spivak, McClelland, Maier & Neustadt, L.L.P.

(57) ABSTRACT

A semiconductor integrated circuit device includes a clock generation unit, a signal processing unit, an FM receiving unit, a processor, and a bus. The signal processing unit, FM receiving unit, and processor operate in synchronization with the clock generated by the clock generation unit. The FM receiving unit includes an RF unit, a canceller and a wave detector. The RF unit performs frequency conversion of the received FM signal using the clock as a base signal. The canceller produces a replica of a noise using a signal as a reference signal to cancel the noise on the FM signal. The signal is obtained by performing frequency conversion of a signal in at least one of the signal processing unit and the bus using the clock as a base signal. The wave detector detects the FM signal in which the noise is cancelled.

15 Claims, 9 Drawing Sheets

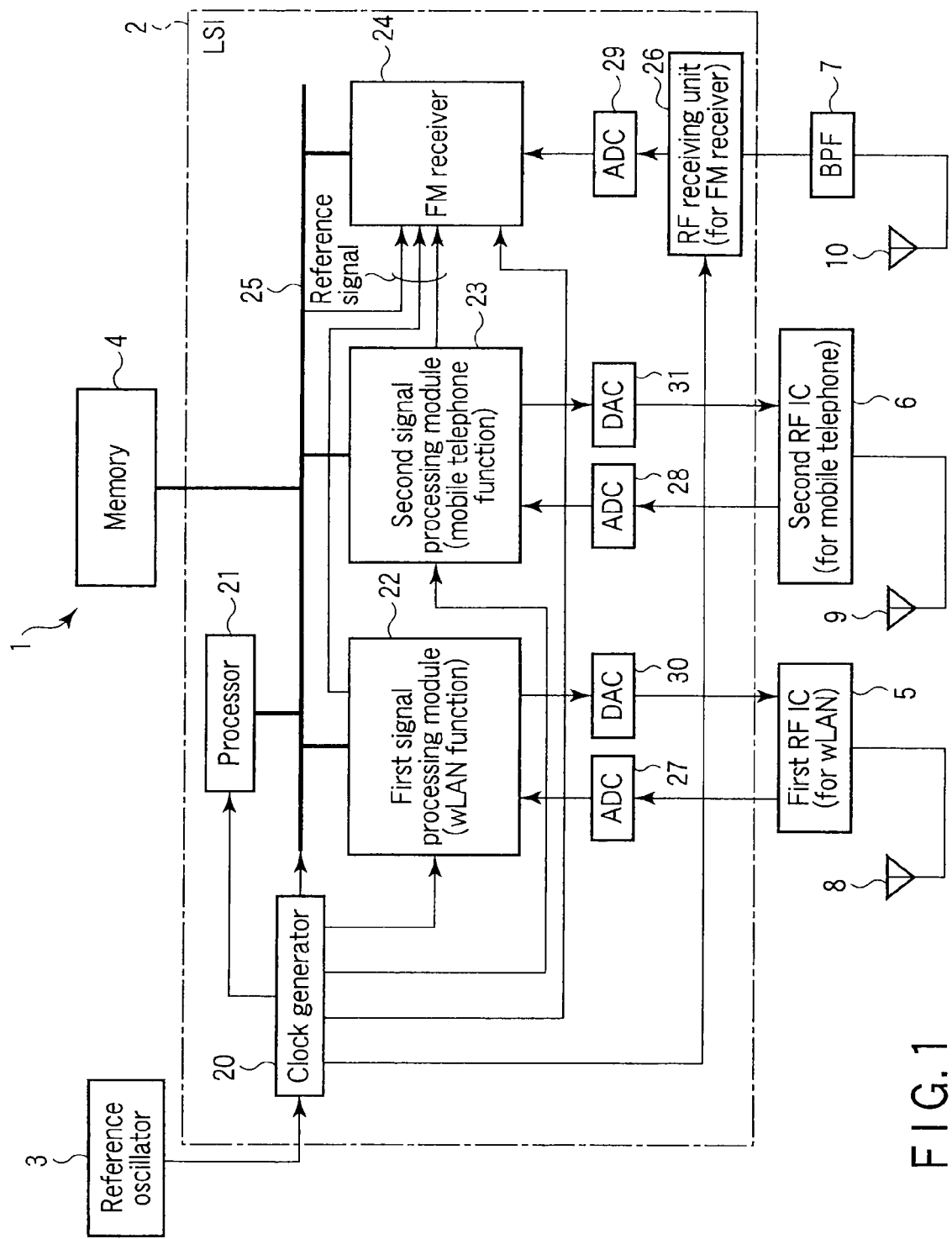
F I G. 1

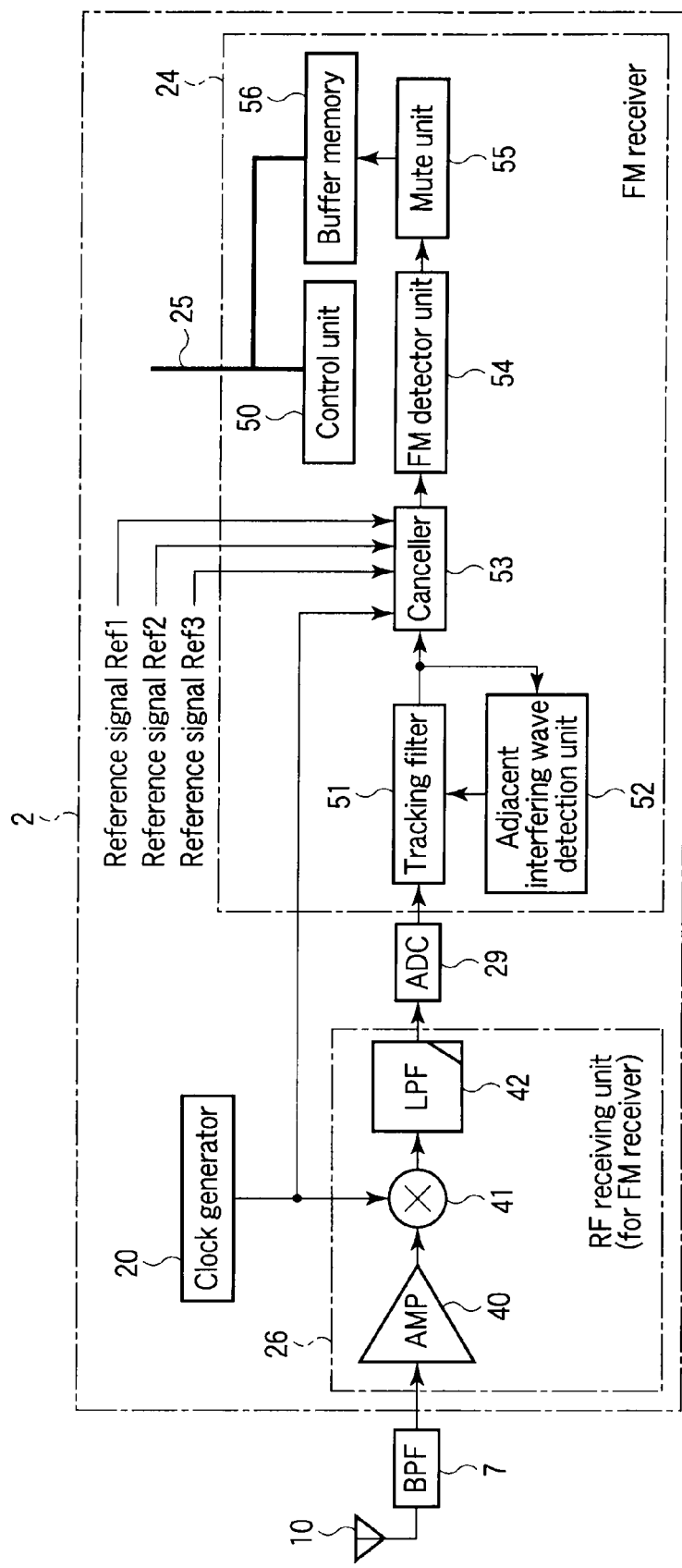
F I G. 2

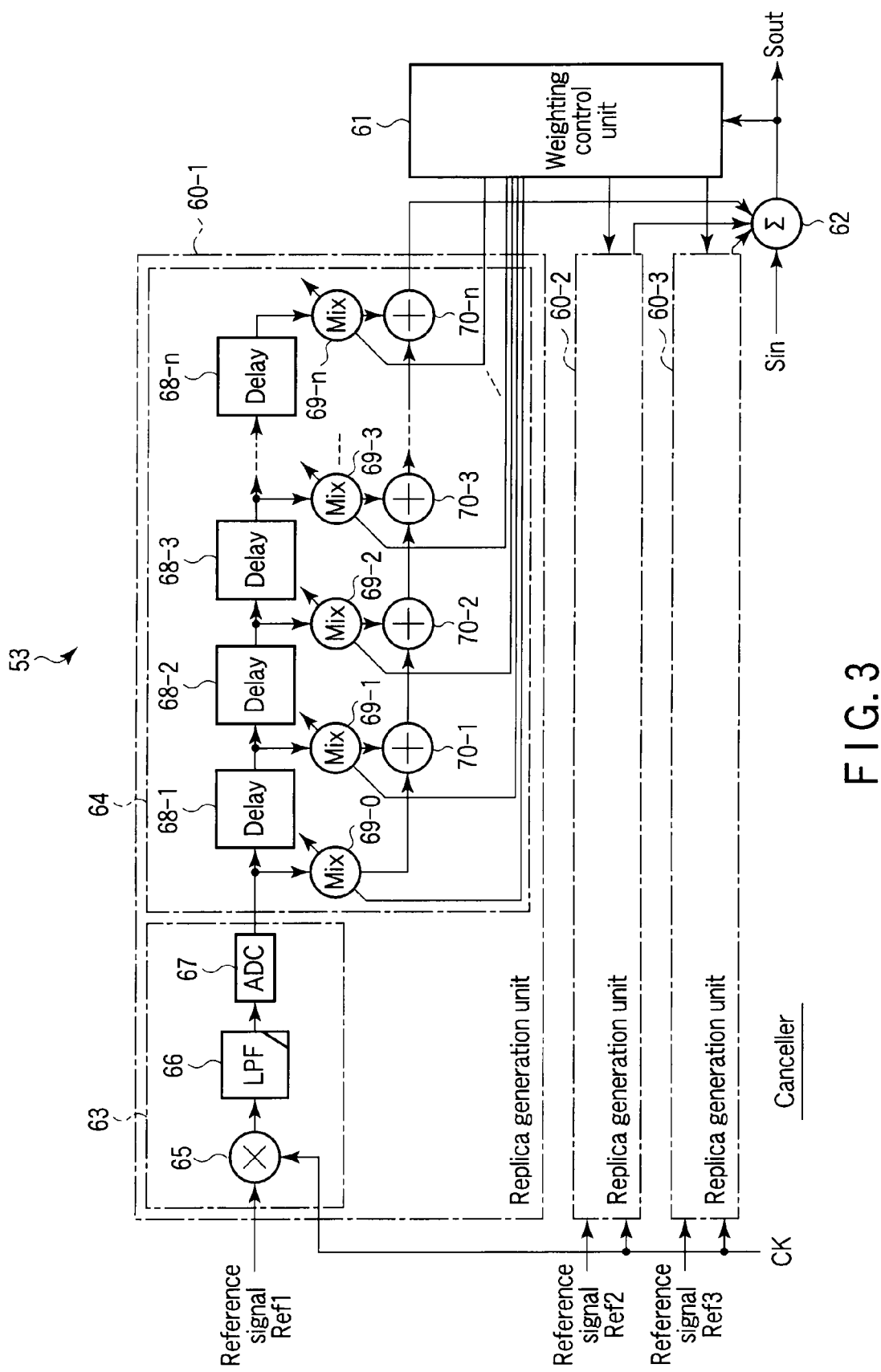
F I G. 3

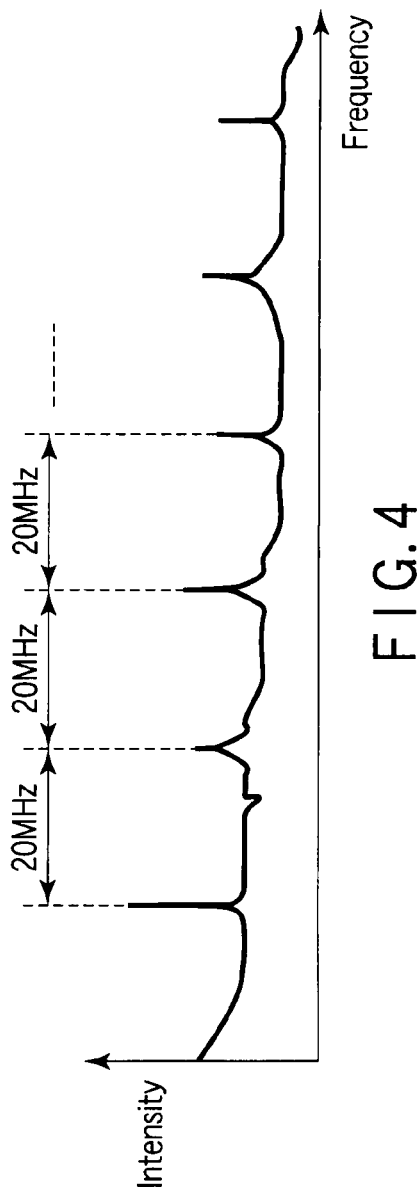
F I G. 4
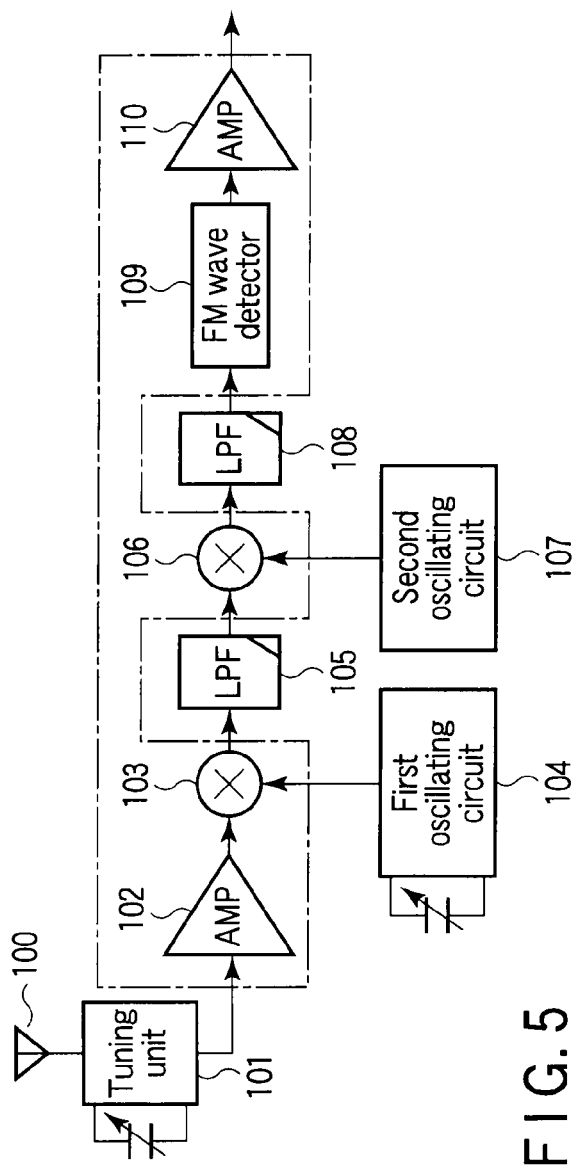
F I G. 5

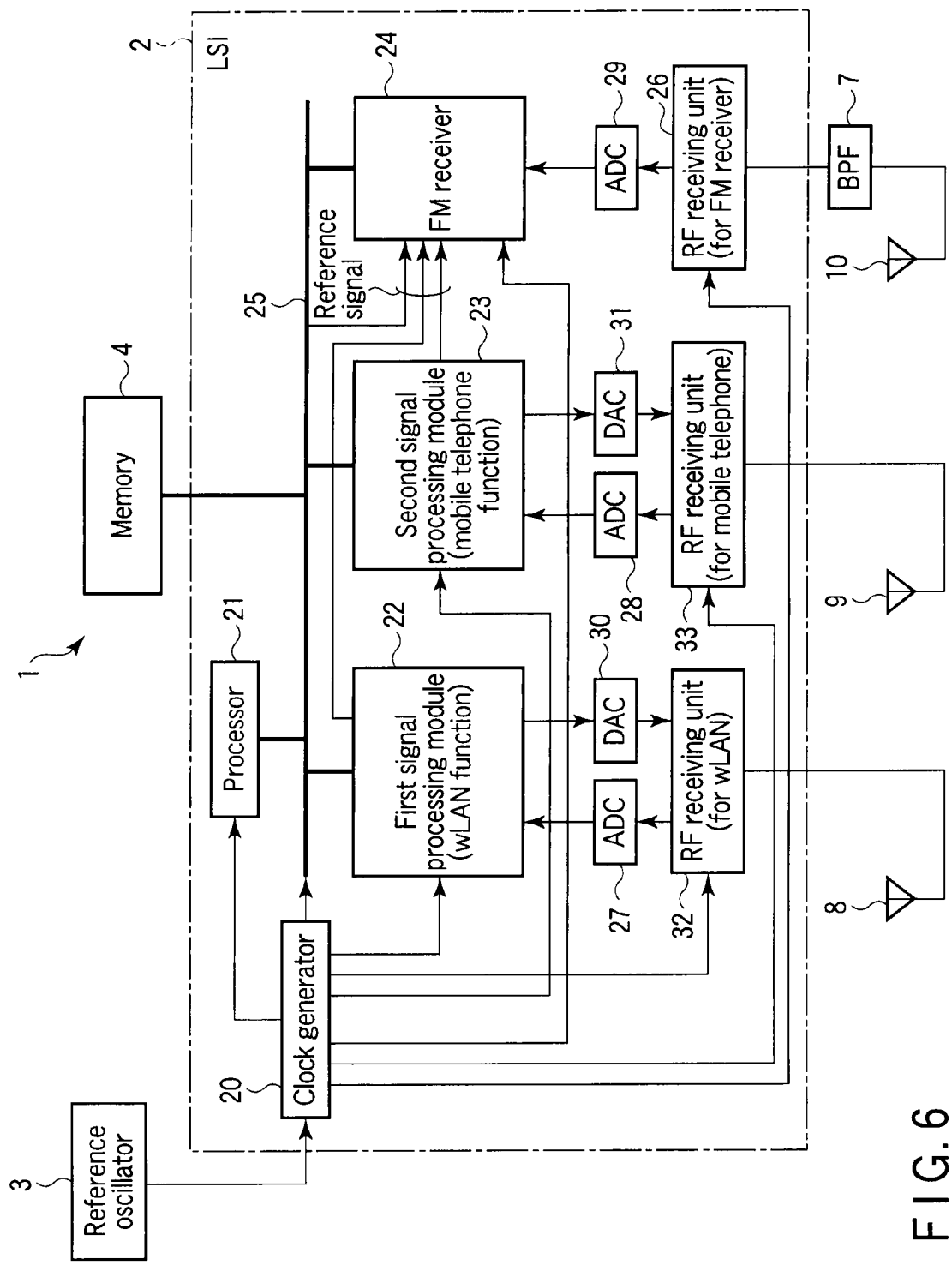
F I G. 6

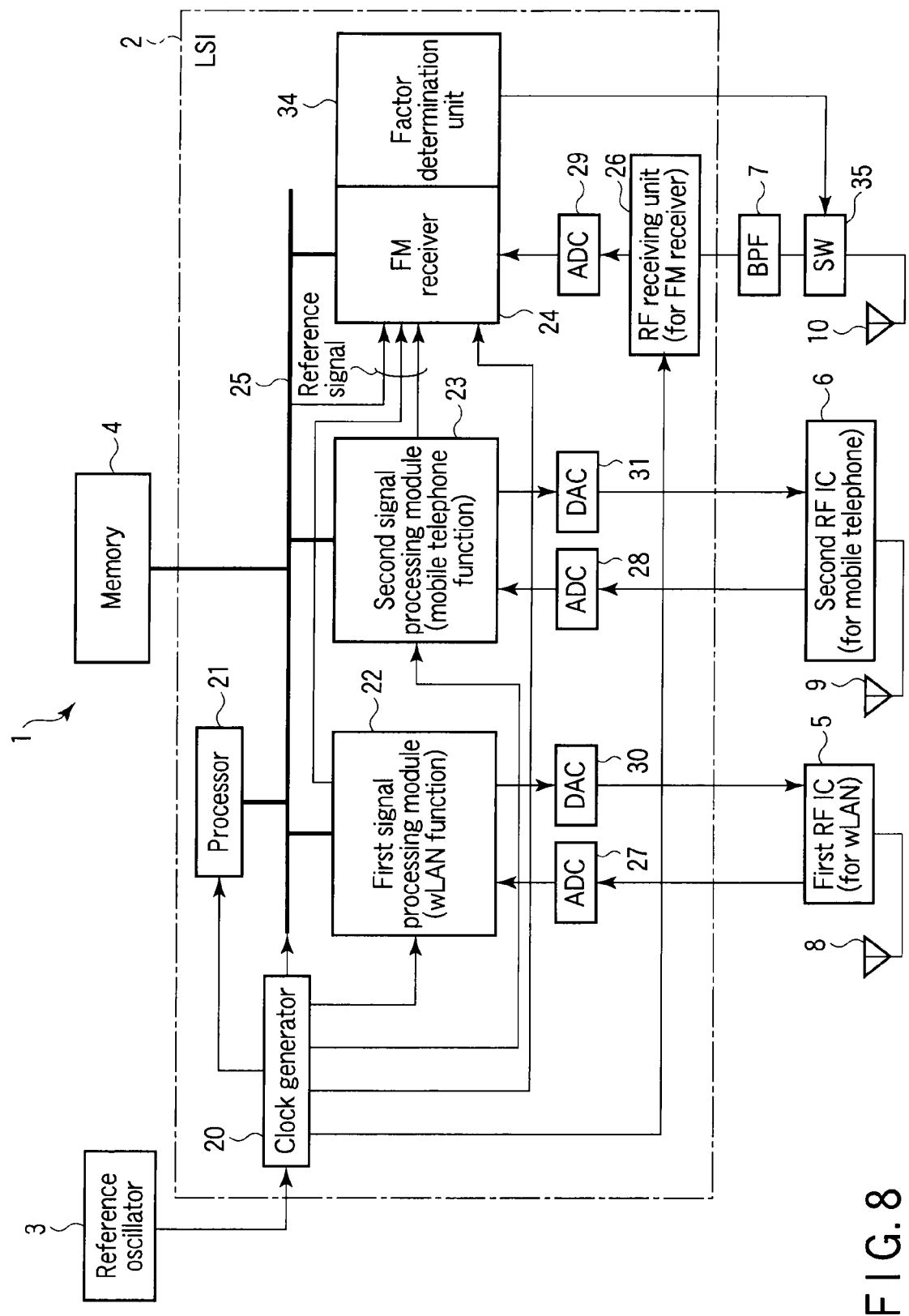
F I G. 8

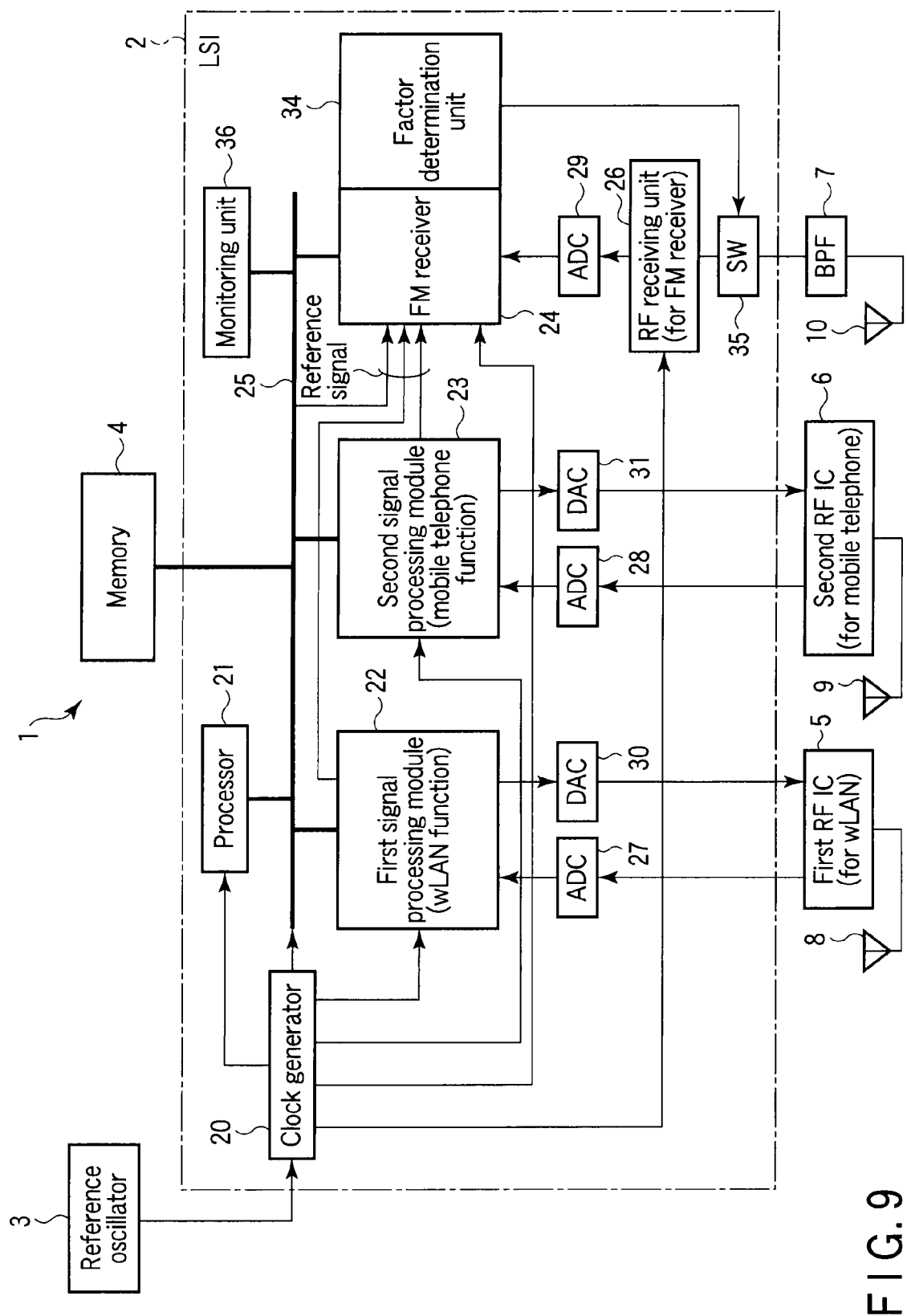
F I G. 9

SEMICONDUCTOR INTEGRATED CIRCUIT DEVICE PROVIDED WITH FM RECEIVING FUNCTION

CROSS-REFERENCE TO RELATED APPLICATIONS

This application is based upon and claims the benefit of priority from prior Japanese Patent Application No. 2008-064240, filed Mar. 13, 2008, the entire contents of which are incorporated herein by reference.

BACKGROUND OF THE INVENTION

1. Field of the Invention

The present invention relates to a semiconductor integrated circuit device, and for example, relates to a system-on-chip (SoC) provided with an FM receiving function.

2. Description of the Related Art

Recently a composite wireless device in which plural wireless transceivers are combined has been widely used with the spread of various wireless systems. Not only a digital communication system but also an analog communication system are combined in the composite wireless system. An FM receiver can be cited as an example of the analog communication system. The FM receiver is used to receive an FM broadcast.

Frequently the conventional FM receiver has a circuit configuration in which FM wave detection is performed after a frequency of a received FM signal is converted into a first intermediate frequency and a second intermediate frequency with plural oscillators. On the other hand, recently there has been adopted a technique of setting the intermediate frequency at a low level in order to eliminate plural frequency selection filters. In this technique, after the frequency is downconverted into the intermediate-frequency signal, an analog-to-digital converter digitizes the intermediate-frequency signal, and a digital signal processor (DSP) performs signal processing to detect an FM wave. Therefore, the circuit scale of the FM receiver can be reduced, and the number of components therein decreased. The spread of the FM receiver having the above-described circuit configuration increasingly adds the FM receiver to an LSI (SoC) provided with a transceiver of another wireless system.

However, in cases where the FM receiver is incorporated in the SoC, noise becomes a major problem. Conventionally, many proposals have been made for the noise reduction of the single FM receiver. For example, Jpn. Pat. Appln. KOKAI Publication No. 2003-168991 discloses the noise reduction of the single FM receiver. However, unfortunately the noise reduction method adopted for the single FM receiver cannot deal with the noise in cases where the FM receiver is incorporated in the SoC.

BRIEF SUMMARY OF THE INVENTION

A semiconductor integrated circuit device according to an aspect of the present invention includes:

a clock generation unit which is formed on a semiconductor substrate and generates a clock;

a signal processing unit which is formed on the semiconductor substrate, and transmits and receives data by a wireless communication, the signal processing unit operating in synchronization with the clock generated by the clock generation unit;

an FM receiving unit which is formed on the semiconductor substrate and receives an FM signal, the FM receiving unit operating in synchronization with the clock generated by the clock generation unit;

a processor which is formed on the semiconductor substrate and controls the signal processing unit and the FM receiving unit, the processor operating in synchronization with the clock generated by the clock generation unit; and a bus which is formed on the semiconductor substrate and connects the signal processing unit, the FM receiving unit, and the processor, the FM receiving unit including:

an RF unit which performs frequency conversion of the received FM signal using the clock generated by the clock generation unit as a base signal;

a canceller which produces a replica of a noise using a signal as a reference signal to cancel the noise on the FM signal, the signal being obtained by performing frequency conversion of a signal in at least one of the signal processing unit and the bus using the clock generated by the clock generation unit as a base signal; and a wave detector which detects the FM signal in which the noise is cancelled.

BRIEF DESCRIPTION OF THE SEVERAL VIEWS OF THE DRAWING

FIGS. 1 and 2 are block diagrams showing a semiconductor device according to a first embodiment of the invention;

FIG. 3 is a block diagram showing a canceller of the first embodiment;

FIG. 4 is a graph showing noise generated in an LSI;

FIG. 5 is a block diagram of an FM receiver;

FIG. 6 is a block diagram showing a semiconductor device according to a modification of the first embodiment;

FIG. 8 is a block diagram showing a semiconductor device according to a modification of the second embodiment;

FIG. 9 is a block diagram showing a semiconductor device according to a third embodiment of the invention.

DETAILED DESCRIPTION OF THE INVENTION

First Embodiment

Figure 7:
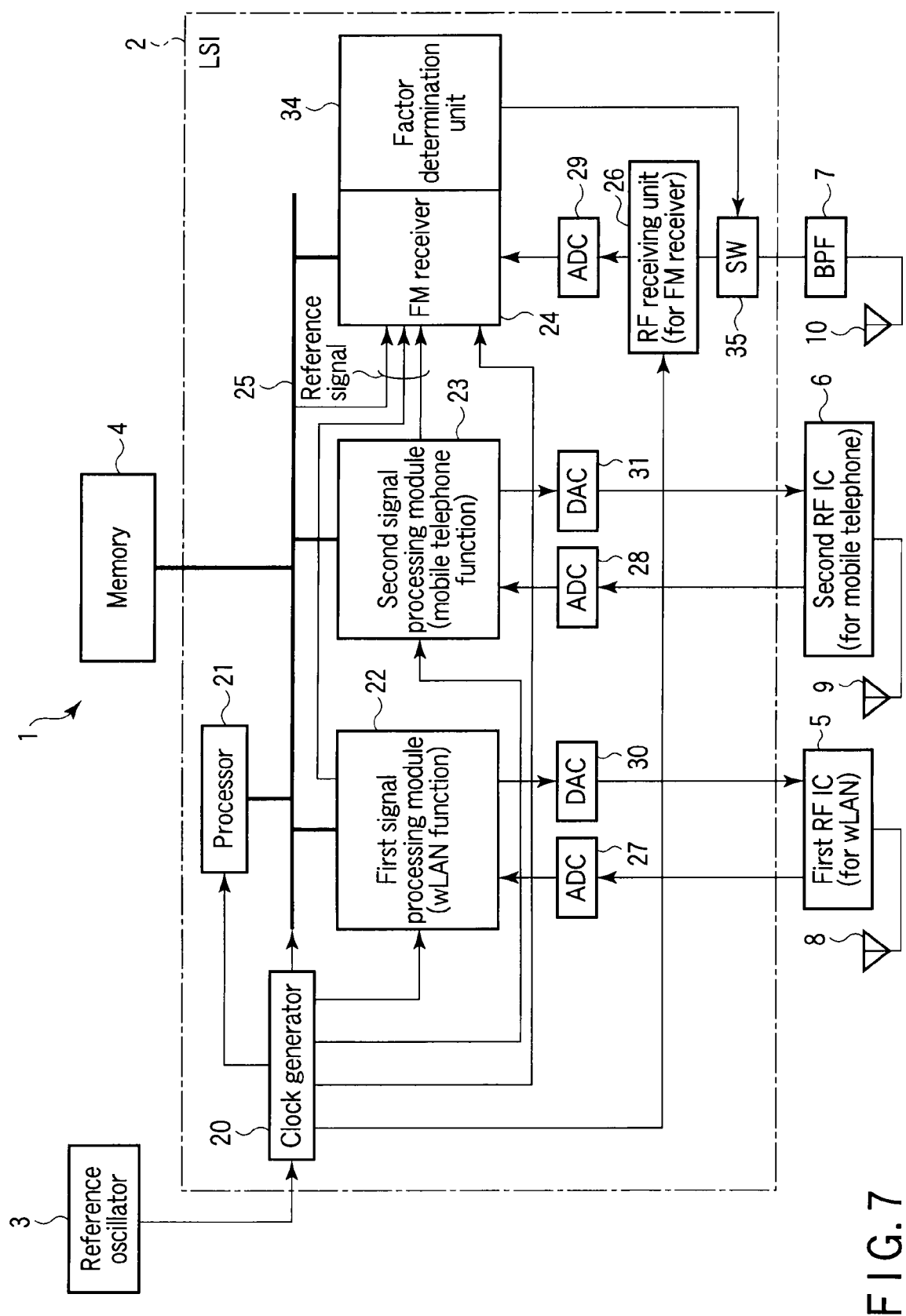
FIG. 7 is a block diagram showing a semiconductor device according to a second embodiment of the invention.

A semiconductor integrated circuit device according to a first embodiment of the invention will be described with reference to FIG. 1. FIG. 1 is a block diagram showing the semiconductor device of the first embodiment.

[Entire Configuration of Semiconductor Device]

As shown in FIG. 1, a semiconductor device 1 of the first embodiment includes a semiconductor integrated circuit (LSI) 2, a reference oscillator 3, a memory 4, a first radio-frequency (RF) integrated circuit (IC) device 5, a second RF IC 6, and a bandpass filter (BPF) 7. A mobile telephone or an LSI module incorporated in a PDA can be cited as an example of the semiconductor device 1.

The semiconductor integrated circuit 2 is an SoC which has a signal processing function of realizing at least one wireless transceiver. An SoC having a wireless local area network (LAN) function, a mobile telephone function, and an FM receiving function will be described below by way of example.

The reference oscillator 3 generates an oscillation signal which becomes a base signal of a clock used in the semiconductor integrated circuit 2. The semiconductor integrated circuit 2 generates the clock using the oscillation signal.

The memory 4 functions as an external memory device of the semiconductor integrated circuit 2. For example, the memory 4 is formed by a nonvolatile semiconductor memory such as an electrically erasable and programmable read-only memory (EEPROM). The data processed by the semiconductor integrated circuit 2 is stored in the memory 4.

The first RF IC 5 is an LSI which functions as an RF unit for the wireless LAN function in the semiconductor integrated circuit 2. In transmitting data, the first RF IC 5 receives a baseband signal (analog signal) for the transmission data from the wireless LAN function. The first RF IC 5 amplifies the received baseband signal to perform frequency conversion of the baseband signal into a predetermined wireless frequency of the wireless LAN. The first RF IC 5 transmits the frequency-converted signal from an antenna 8 onto a wireless transmission path. In receiving the data, the first RF IC 5 downconverts the frequency of the received analog signal through the wireless LAN communication, and supplies the baseband signal obtained by downconverting the frequency to the wireless LAN function in the semiconductor integrated circuit 2.

The second RF IC 6 is an LSI which functions as an RF unit for the mobile telephone function in the semiconductor integrated circuit 2. The second RF IC 6 performs the processing similar to that of the first RF IC 5 to the mobile telephone function using an antenna 9.

The bandpass filter 7 transmits only a signal having a predetermined frequency band in the FM broadcast, among signals received by an antenna 10 through the wireless transmission path. The transmitted signal is supplied to the FM receiving function of the semiconductor integrated circuit 2.

In the first and second RF ICs 5 and 6, sometimes a filter is required outside the LSI (first and second RF ICs 5 and 6) depending on an LSI implementation method. For example, the filter is required outside the LSI when a signal selecting the RF signal is filtered by a surface acoustic wave (SAW) filter provided outside the LSI. In such cases, the signal is tentatively supplied to the outside after impedance is adjusted in the LSI for the purpose of connection of the SAW filter, and the signal is returned into the LSI. The above-described wiring connection is omitted in FIG. 1. The wiring for controlling the operations of the first and second RF IC 5 and 6 and a control function thereof are also omitted in FIG. 1.

[Details of Semiconductor Integrated Circuit 2]

The detailed configuration of the semiconductor integrated circuit 2 will be described with reference to FIG. 1. As shown in FIG. 1, the semiconductor integrated circuit 2 includes a clock generator 20, a processor 21, a first signal processing module 22, a second signal processing module 23, an FM receiver 24, a bus 25, an RF receiving unit 26, analog-to-digital converters 27 to 29, and digital-to-analog converters 30 and 31. These components are formed on the same semiconductor substrate to form an SoC. Only the components necessary to describe the first embodiment are shown in FIG. 1, and all the components necessary to operate all the functions of the semiconductor integrated circuit 2 are not shown.

The clock generator 20 generates a clock which becomes a reference of the operation of the semiconductor integrated circuit 2 based on the oscillation signal supplied from the reference oscillator 3. The clock is supplied to the processor 21, the first signal processing module 22, the second signal processing module 23, the FM receiver 24, the bus 25, and the RF receiving unit 26. An operation setting of the clock generator 20 is changed in response to a command issued from the processor 21. That is, the processor 21 controls start/stop of the clock generation and a frequency and a duty of the clock.

The processor 21 is operated in synchronization with the clock generated by the clock generator 20. The processor 21 controls each unit in the semiconductor integrated circuit 2, thereby controlling the operation of the whole of the semiconductor integrated circuit 2.

The first signal processing module 22 is operated in synchronization with the clock generated by the clock generator 20, and performs signal processing under the control of the processor 21. The first signal processing module 22 realizes the wireless LAN function. That is, the first signal processing module 22 produces a packet used in wireless LAN communication and performs the signal processing such as decoding of the received packet.

In transmitting data, the first signal processing module 22 produces the transmission data. The processor 21 may produce the transmission data. The first signal processing module 22 adds a Media Access Control (MAC) header to the transmission data to construct a frame. The frame shall mean transmission or reception data which is constructed so as to conduct wireless communication. Then modulation such as redundant coding and orthogonal frequency division multiplexing (OFDM) is performed to the frame to obtain the baseband signal. Then the baseband signal is converted into an analog signal by the digital-to-analog converter 30, and the analog signal is transmitted from the antenna 8 onto the wireless transmission path through the first RF IC 5.

In receiving data, the first signal processing module 22 performs processing the reverse of the data transmission. The signal received by the antenna 8 is supplied to the analog-to-digital converter 27 through the first RF IC 5 to digitize the analog signal. The first signal processing module 22 performs the OFDM demodulation and error correction decoding to the received data converted into the digital signal to obtain the frame. The first signal processing module 22 removes the MAC header from the frame to obtain the packet. The packet shall mean transmission or reception data which is constructed into the data structure dealt with by a personal computer. The packet may be processed by the first signal processing module 22 or the processor 21.

The second signal processing module 23 is operated in synchronization with the clock generated by the clock generator 20, and performs the signal processing under the control of the processor 21. The second signal processing module 23 realizes the mobile telephone function. That is, the second signal processing module 23 performs encoding and decoding of an audio signal used in the mobile telephone communication.

In the mobile telephone communication, the second signal processing module 23 performs the redundant coding and modulation to the audio signal to produce the transmission data. The digital-to-analog converter 31 converts the transmission data into an analog signal, and the analog signal is transmitted from the antenna 9 onto the wireless transmission path through the second RF IC 6. The signal received by the antenna 9 is fed into the analog-to-digital converter 28 through the first RF IC 6 to digitize the analog signal. The second signal processing module 23 performs the demodulation and error correction decoding on the digitized received data to obtain the audio signal. That is, the second signal processing module 23 controls the wireless data communication like the first signal processing module 22, and has the same basic operation as the first signal processing module 22.

The FM receiver 24 is operated in synchronization with the clock generated by the clock generator 20, and performs the signal processing under the control of the processor 21. The FM receiver 24 realizes the FM receiving function. That is, the FM receiver 24 performs audio processing and data processing to the received FM signal. The FM receiver 24 also reduces noise on the received FM signal. At this point, in order to reduce the noise generated in the LSI 2, the signals in the first and second signal processing modules 22 and 23 and the bus are used as a reference signal. Accordingly, the wiring for transmitting the reference signal is provided between the FM receiver 24 and the first and second signal processing modules 22 and 23 and bus 25.

The RF receiver 26 performs the frequency conversion (downconverts) to the signal transmitted through the bandpass filter 7 (signal in a wireless frequency band of the FM broadcast) to obtain the baseband signal. The local oscillation frequency used in the frequency conversion is supplied from the clock generator 20. The signal to which the RF receiver 26 performs the frequency conversion is digitized by the analog-to-digital converter 29. The resulting digital signal is supplied to the FM receiver 24 as the FM signal. That is, the RF receiver 26 also functions as a part of the unit which realizes the FM receiving function.

The bus 25 is operated in synchronization with the clock generated by the clock generator 20. The bus 25 connects the processor 21, the first signal processing module 22, the second signal processing module 23, and the FM receiver 24 such that the communication can be conducted among the these components.

[Detail of FM Receiving Function]

The FM receiving function in the semiconductor integrated circuit 2 having the above-described configuration will be described in detail. First, the FM receiver 24 and the RF receiving unit 26 will be described in detail with reference to FIG. 2. FIG. 2 is a block diagram of the semiconductor integrated circuit 2, and particularly FIG. 2 shows the detailed configurations of the FM receiver 24 and RF receiving unit 26.

[Details of RF Receiving Unit 26]

First, the RF receiving unit 26 will be described. As shown in FIG. 2, the RF receiving unit 26 includes an amplifier 40, a mixer 41, and a lowpass filter (LPF) 42.

The amplifier 40 amplifies the received FM signal transmitted through the bandpass filter 7. The mixer 41 mixes the reception signal amplified by the amplifier 40 and a local frequency to downconvert a frequency of the reception signal to an intermediate frequency. The local frequency is generated by the clock generator 20. The local frequency is changed according to a channel of the received FM broadcast. The lowpass filter 42 performs the filtering to the reception signal downconverted by the mixer 41, and supplies the filtering result to the analog-to-digital converter 29.

[Details of FM Receiver 24]

Then the FM receiver 24 will be described. As shown in FIG. 2, the FM receiver 24 includes a tracking filter 51, an adjacent interfering wave detection unit 52, a canceller 53, an FM detector unit 54, a mute unit 55, a buffer memory 56, and a control unit 50.

The tracking filter 51 includes a bandpass filter (BPF) whose cutoff frequency is variable. The cutoff frequency is changed in response to a setting instruction provided from the adjacent interfering wave detection unit 52. Using the bandpass filter, the tracking filter 51 removes an interfering wave of an adjacent frequency from the FM signal supplied from the analog-to-digital converter 29. The FM signal in which the interfering wave is removed is supplied to the canceller 53 and the adjacent interfering wave detection unit 52.

The adjacent interfering wave detection unit 52 monitors a signal level of the frequency adjacent to the FM signal which becomes the reception target, and determines the cutoff frequency of the tracking filter 51 according to the signal level. In cases where the interfering wave exists in the adjacent frequency band, the tracking filter 51 performs control so as to narrow the transmitted frequency of the desired signal.

That is, the adjacent interfering wave detection unit 52 includes a first bandpass filter, a second bandpass filter, a first detector circuit, a second detector circuit, a level detection circuit, and a control circuit. The first bandpass filter cuts out a high frequency band of the FM signal. The first detector circuit obtains the signal level of the first bandpass filter. The second bandpass filter cuts out a low-frequency band of the FM signal. The second detector circuit obtains the signal level of the second bandpass filter. The level detection circuit obtains a level of the interfering wave from wave detection outputs of the first and second detector circuits. The control circuit controls the cutoff frequency of the tracking filter 51 based on the signal level obtained by the level detection circuit.

The canceller 53 reduces the noise on the FM signal supplied from the tracking filter 51. The noise is an internal signal component of the semiconductor integrated circuit 2. Therefore, an influence that a frequency component of the noise radiated by the semiconductor integrated circuit 2 is matched with the frequency component of the FM broadcast to deteriorate reception performance can be removed. At this point, the canceller 53 uses the signal in the semiconductor integrated circuit 2 as the reference signal in order to reduce the noise. The detailed operation of the canceller 53 will be described later.

The FM detector unit 54 performs the FM wave detection to the FM signal supplied from the canceller 53. Then the mute unit 55 performs mute processing if needed. After the mute processing, the FM signal is stored in the buffer memory 56. The FM signal stored in the buffer memory 56 is supplied to the outside of the FM receiver 24 through the bus 25.

The control unit 50 controls each processing unit in the FM receiver 24.

[Details of Canceller 53]

The canceller 53 will be described in detail. The canceller 53 produces a replica of the noise radiated by the semiconductor integrated circuit 2, and eliminates the replica from the reception signal. FIG. 3 is a circuit diagram showing a configuration of the canceller 53.

As shown in FIG. 3, the canceller 53 includes three replica generation units 60-1 to 60-3, a weighting control unit 61, and a mixer 62. In the following description, in cases where the three replica generation units 60-1 to 60-3 are not distinguished from one another, the replica generation units 60-1 to 60-3 are simply referred to as the replica generation unit 60. The number of replica generation units 60 is not limited to three, but one or at least two replica generation units 60 may be provided.

The replica generation units 60-1 to 60-3 generate the replicas using the internal signals in the semiconductor integrated circuit 2 as the reference signals Ref1 to Ref3. The replica generation unit 60-1 will be described below by way of example. The replica generation units 60-2 and 60-3 have the same configuration as the replica generation unit 60-1. The replica generation unit 60 mainly includes an input unit 63 and a generation unit 64.

The input unit 63 includes a mixer 65, a lowpass filter 66, and an analog-to-digital converter 67. The mixer 65 mixes the reference signal Ref1 and a clock CK generated by the clock generator 20. That is, the mixer 65 downconverts the reference signal Ref1 using the same signal as the local frequency input to the RF receiver 26. The reference signal Ref1 downconverted by the mixer is filtered by the lowpass filter 66, then digitize by the analog-digital converter 67. Then the reference signal Ref1 digitized by the analog-to-digital converter 67 is supplied to the generation unit 64.

The generation unit 64 produces the replica of the noise based on the reference signal Ref1 supplied from the input unit 63. The generation unit 64 is formed by a tapped delay line. Each of the signals supplied from the taps is multiplied by each weighting factor, and the signals are added. The replica signal produced in the above-described way is subtracted from the FM signal. That is, as shown in FIG. 3, the generation unit 64 includes n (n is a natural number) delay circuits 68-1 to 68-n, (n+1) mixers 69-0 to 69-n, and n adders 70-1 to 70-n.

The n delay circuits 68-1 to 68-n are connected in series. The delay circuit 68-1 located in the earliest stage delays the output of the analog-to-digital converter 67. Each of the delay circuits 68-$i$ ($i$=2 to n) located in the stages from the second stage delays the output of the delay circuit 68-($i$−1) located in the immediately precedent stage. The mixer 69-0 performs weighting of the output of the analog-to-digital converter 65 under the control of the weighting control unit 61. The mixers 69-1 to 69-n perform the weighting to the outputs of the delay circuits 68-1 to 68-n, respectively. In the adders 70-1 to 70-n, the adder 70-1 located in the earliest stage adds the output of the mixer 69-0 and the output of the mixer 69-1. Each of the adders 70-$i$ ($i$=2 to n) located in the stage from the second stage adds the output of the adder 70-1 ($i$−1) located in the immediately precedent stage and the output of the mixer 69-$i$.

The output of the adder 70-n is supplied as the replica of the noise based on the reference signal Ref1.

The FM signal supplied from the tracking filter 51 is supplied to the mixer 62 as an input signal Sin. The mixer 62 subtracts the replicas of the noise produced by the replica generation units 60-1 to 60-3 from the input signal Sin. The subtraction result is supplied as an output signal Sout of the canceller 53.

The weighting control unit 61 determines the weighting factor to the signal supplied from each tap of the tapped delay line. That is, the weighting control unit 61 determines the weighting factors used in the mixers 69-0 to 69-n of the replica generation unit 60. At this point, the weighting control unit 61 monitors the output signal Sout of the mixer 62, and controls the weighting factors such that the noise is reduced in the output signal Sout. For example, blind equalizing signal processing is used for the control.

An operation of the canceller 53 will be described below. The canceller 53 suppresses a noise component matched with the FM broadcast band in the noise radiated by the semiconductor integrated circuit 2. Because a noise component n(t) superimposed on a desired wave is mixed from a certain signal source through plural propagation channels, the noise component n(t) can be expressed by the following equation (1):

$$n(t) = \sum_i hi(t) \cdot a(t - \tau i) \quad (1)$$

where a(t) is a noise source, t is a time, h(t) is an amplitude and a phase fluctuation of the noise, and i is the number of propagation channels. ai(t) indicates a noise source in each propagation channel and hi(t) indicates the amplitude and phase fluctuation of each propagation channel. That is, the noise component n(t) is sum of plural components h(t)·a(t−τ) in which the amplitude and phase fluctuation of the propagation channel is multiplied by the noise source a(t·τ) having the different delay time in each propagation channel. τi indicates the delay time in each propagation channel.

In order to reproduce the noise component n(t), as shown in FIG. 3, the canceller 53 includes the plural delay elements 68-1 to 68-n (tapped delay line), the multipliers 69-0 to 69-n which perform the multiplication to the plural weighting factors, and the adders 70-1 to 70-n which perform the addition to the products.

In the semiconductor integrated circuit, the desired delay time can easily be produced by a method for inserting plural gates in the signal line. This is because the function of the adjustment of the delay time of the internal clock in the digital signal processing integrated circuit is needed to match the operation timing among plural flip-flops. The delay line produced in the semiconductor integrated circuit can be used in the delay elements 68-1 to 68-n of the canceller 53.

The noise to be removed by the canceller 53 is radiated by the semiconductor integrated circuit 2. That is, the noise source exists in the semiconductor integrated circuit 2. Therefore, in the embodiment, the digital signal used in the semiconductor integrated circuit 2 is utilized as the reference signal for operating the canceller 53.

In the canceller 53, the weighting control unit 61 determines a tentative weighting factor, whereby replica generation units 60-1 to 60-3 produce the replicas. When the replicas are subtracted from the input signal Sin, ideally only the desired FM signal (FM signal in which all the noise is reduced) remains. However, because the replicas are produced using the tentative weighting factor, the replica is not equivalent to the true noise component. Accordingly, an error component (noise component in which the replicas are subtracted from the noise component) remains in the output signal Sout. The weighting control unit 61 takes out the error component to delicately change the previously-used weighting factor. The weighting control unit 61 causes the replica generation unit 60 to produce the replica again. Similarly the weighting control unit 61 takes out the error component again, and changes the weighting factor such that the error component is decreased.

For the signal processing for controlling the weighting factor, there have been already proposed plural methods. There are proposed various methods (blind algorithms) for separating the desired signal component and the noise component even if a waveform of the desired signal is changed continuously. Accordingly the well-known methods can be used to control the weighting factor.

[Effect]

The following effect (1) is obtained in the semiconductor integrated circuit of the first embodiment.

(1) The reception performance of the FM broadcast can be improved.

According to the first embodiment, the SoC, which has the signal processing function of the wireless communication for plural communication systems, includes the FM receiver which has the canceller removing the signal radiated from the SoC itself. Accordingly, the reception performance of the FM receiver can be improved in the SoC. The effect will be described in detail.

As described in the background, recently the composite wireless device in which the plural wireless transceivers are embedded is widely used with the spread of various wireless systems, and frequently the FM receiver is provided in the semiconductor integrated circuit (SoC) including the plural wireless communication system functions.

A mobile telephone or a wireless LAN system can be cited as an example of the wireless system which is mixed as the composite wireless device in the SoC. Frequently the clock frequency used by the signal processing function for the wireless LAN system is multiplied by 20 MHz when the wireless LAN standard is pursuant to IEEE 802.11a or IEEE 802.11g. This is because the wireless LAN system communicates using a 20-MHz bandwidth. At this point, frequently an operating frequency of the bus (bus 25 in FIG. 1) connected to the signal processing function of the wireless LAN and an operating frequency of the processor (processor 21 in FIG. 1) are also multiplied by 20 MHz. This is because the varieties of the frequency of the clock used in the SoC can be decreased to simplify the configuration of the clock generator 20.

Therefore, sometimes the multiple of 20 MHz is matched with the frequency band of the FM broadcast. For example, when an 80-MHz clock is used as the clock of the bus or the signal processing function (function module) realized by hardware, the frequency of the 80-MHz of the clock overlaps the frequency band of the FM broadcast. As a result, the reception performance of the FM broadcast deteriorates in the frequency band.

FIG. 4 shows an example of a spectrum radiated by the semiconductor integrated circuit 2 of FIG. 1. In FIG. 4, the horizontal axis indicates a frequency and the vertical axis indicates spectral density. The radiated signal is extremely weak. The radiated signal having the extremely weak level is being lowered by layout design of the semiconductor integrated circuit and a technical innovation of the configuration of the internal circuit. However, actually a certain level of electric power is still supplied. A line spectrum ranging from tens to hundreds of megahertz emerges according to speed enhancement of the signal processing function or the processor. The line spectrum emerges at a frequency of the internal bus, a frequency multiplied by the frequency of the internal bus, a frequency of the processor, or a frequency multiplied by the frequency of the processor.

As described above, frequently the clock used in the signal processing function for the wireless LAN system is multiplied by 20 MHz. In such cases, the line spectrum of FIG. 4 emerges in each 20 MHz. Sometimes the frequency of the noise radiated by the highly-functional SoC is matched with the FM broadcast band. For the signal processing units for other wireless systems, sometimes the system frequency of the signal processing unit is matched with the FM broadcast band according to the speed enhancement of the processor or the signal processing logic.

On the other hand, for reducing the noise component such as impulse noise in the FM receiver, a function of masking a temporal change component of the signal in rapidly changing the temporal change component is frequently mounted on the FM receiver. However, the function is a countermeasure only for the single FM receiver (FM receiver which is not embedded to the SoC), and the noise reduction function hardly prevents the deterioration of the reception performance which is generated in matching the clock used in the SoC with the frequency band of the FM broadcast.

In the FM receiver, frequently the frequency conversion is performed with plural different oscillators. Therefore, an unnecessary signal superimposed on the reception signal of the FM broadcast becomes incoherent, which results in a problem in that the canceller hardly removes the unnecessary signal. The problem will be described below with reference to FIG. 5. FIG. 5 is a block diagram showing a conventional FM receiver and RF unit.

As shown in FIG. 5, the FM signal received by an antenna 100 is passed through a tuning circuit 101, the FM signal is amplified by an amplifier 102, and a mixer 103 downconverts the FM signal to a first intermediate frequency (for example, 10.7-MHz band). At this point, the mixer 103 utilizes a first oscillating circuit 104 as a local oscillator. Then the FM signal is transmitted through a lowpass filter 105, and a mixer 106 downconverts the FM signal to a second intermediate frequency (for example, 455-kHz band). At this point, the mixer 106 utilizes a second oscillating circuit 107 as a local oscillator. Then the FM signal is supplied to a FM wave detector 109 through a lowpass filter 108, and is amplified by an amplifier 110. Thus, in the conventional configuration, because the frequency conversion is performed with the plural local oscillators, the coherency is hardly maintained.

There is a method for changing the frequency used in the SoC according to the reception frequency of the FM broadcast in order to prevent an influence of an interference wave such as the clock used in the SoC with the reception frequency of the FM broadcast. However, in the method, unfortunately configurations of other wireless signal processing functions become complicated.

In cases where the FM receiver is embedded to an SoC including various wireless communication systems, unfortunately the reception performance of the specific FM broadcast is deteriorated depending on the frequency used in the SoC. The phenomenon in which the digital noise generated in the SoC interferes with the desired wave is a particular problem in the integrated circuit which is used as the composite wireless device and the transceiver for the plural wireless systems is embedded to the SoC. The problem becomes severer with the progress of function and dense mounting. Accordingly, in the conventional FM receiver, there are proposed various techniques of reducing the noise superimposed on the wireless transmission path. However, the problem of the noise generated in the SoC does not arise in the conventional FM receiver, and there has not been proposed a technique of solving the problem of the noise generated in the SoC.

Therefore, in the first embodiment, the generation unit 64 of the canceller 53 produces the replica of the noise using the digital signal in the SoC as the reference signal. Examples of the reference signal include the clock of the bus 25 and the control signal used in the signal processing modules 22 and 23. More particularly, the frequency conversion is performed on the reference signal, the analog-to-digital converter 67 digitizes the reference signal which has frequency-converted, and the generation unit 64 produce the replica using the digitized reference signal. Therefore, the noise component which is generated in the SoC and matched with the FM broadcast band can be suppressed.

In the configuration of the first embodiment, the clock generator 20 generates both the local oscillation signal which is used when the mixer 65 performs the frequency conversion to the reference signal and the local oscillation signal which is used when the RF receiving unit 26 performs the frequency conversion. Accordingly, both the signals to which the frequency conversions are performed by the mixer 65 and the RF receiving unit 26 are coherent to each other (phases are matched with each other). In other words, the reference signal which is obtained by the frequency conversion in the input unit 63 and the FM signal obtained by the frequency conversion in the RF receiving unit 26 are coherent to each other. Therefore, the noise component superimposed on the FM signal and the replica produced by the replica generation unit 60 are coherent to each other, so that the canceller 53 can more effectively remove the noise.

In FIG. 1, the first and second RF ICs 5 and 6 are arranged outside the semiconductor integrated circuit 2. Alternatively, the first and second RF ICs 5 and 6 may be arranged in the semiconductor integrated circuit 2. FIG. 6 shows an example of the case in which the first and second RF ICs 5 and 6 are arranged in the semiconductor integrated circuit 2.

As shown in FIG. 6, the first and second RF ICs 5 and 6 are eliminated in the configuration of FIG. 1, and RF receiving units 32 and 33 are provided in the semiconductor integrated circuit 2. The RF receiving units 32 and 33 have the functions similar to those of the first and second RF ICs 5 and 6, and act as the RF unit for the wireless LAN and the RF unit for the mobile telephone, respectively. The RF receiving units 32 and 33 perform the frequency conversion using the clock generated by the clock generator 20. In the configurations of FIGS. 1 and 6, the bandpass filter 7 may also be arranged in the semiconductor integrated circuit 2.

Second Embodiment

A semiconductor integrated circuit device according to a second embodiment of the invention will be described below. In the second embodiment, the input of the FM signal received through the wireless transmission path is prohibited in determining the weighting of the canceller 53 of the first embodiment. Only the point which is different from that of the first embodiment will be described below.

FIG. 7 is a block diagram showing a semiconductor device of the second embodiment. As shown in FIG. 7, the semiconductor integrated circuit 2 of the second embodiment includes a factor determination unit 34 and a switch 35 in addition to the configuration of the first embodiment of FIG. 1. Other configurations are identical to those of the first embodiment of FIG. 1.

The switch 35 switches connection/non-connection between the bandpass filter 7 and the RF receiving unit 26. When the switch 35 connects the bandpass filter 7 and the RF receiving unit 26, the FM signal received through the wireless transmission path is supplied to the RF receiving unit 26. In the case of the non-connection, the FM signal is prohibited to be supplied to the RF receiving unit 26.

The factor determination unit 34 controls the operation of the switch 35 and the operation of the weighting control unit 61 in the canceller 53. That is, the factor determination unit 34 issues a command for determining the weighting factor in the weighting control unit 61. In determining the weighting factor, the factor determination unit 34 turns off the switch 35. That is, the factor determination unit 34 releases connection between the bandpass filter 7 and the RF receiving unit 26, and prohibits the FM signal to be input to the semiconductor integrated circuit 2. After the weighting factor is determined, the factor determination unit 34 connects the bandpass filter 7 and the RF receiving unit 26, and permits the FM signal to be input to the semiconductor integrated circuit 2.

The operations of the factor determination unit 34, the switch 35, and the canceller 53 in the FM receiver 24 will specifically be described below.

In operating the FM receiver 24, the factor determination unit 34 controls the switch 35 such that the FM signal is not input to the RF receiving unit 26 from the antenna 10. That is, the factor determination unit 34 turns off the switch 35. Then, in order to minimize the error signal, the factor determination unit 34 issues a command for determining the weighting factor to the weighting control unit 61 included in the canceller 53 of the FM receiver 24. After the weighting factor is determined, the factor determination unit 34 controls the switch 35 again such that the FM signal is input to the RF receiving unit 26. That is, the factor determination unit 34 turns on the switch 35.

The weighting factor can be determined only in starting the operation of the FM receiver 24, or can be updated so as to be sequentially optimized using the blind algorithm. The error signal is obtained from (desired wave component (net FM signal)+unnecessary wave component (noise generated in semiconductor integrated circuit 2)−replica component). In the blind algorithm, the desired wave component is removed from the error signal, and an operation is performed such that (unnecessary wave component−replica component) is brought close to zero.

In the semiconductor integrated circuit of the second embodiment, the following effect (2) is obtained in addition to the effect (1) of the first embodiment.

(2) The noise can easily be cancelled.

In order to produce the replica of the component superimposed on the reception signal in the canceller 53, it is necessary to optimize the weighting factor of the canceller 53. Therefore, the weighting factor is selected such that the error signal which is the signal removed from the reception signal becomes the minimum.

In the configuration of the second embodiment, the FM signal received through the wireless transmission path is not supplied to the FM receiver 24 in determining the weighting factor. That is, the input signal Sin of FIG. 3 does not include the FM signal, but includes only a background signal of the FM signal and the noise. Accordingly, the canceller 53 easily performs the signal processing to produce the replica, so that the noise can easily be cancelled.

In the configuration of FIG. 7, the switch 35 is provided in the semiconductor integrated circuit 2. Alternatively, the switch 35 may be provided outside the semiconductor integrated circuit 2. The case in which the switch 35 is provided outside the semiconductor integrated circuit 2 will be described with reference to FIG. 8. FIG. 8 is a block diagram showing the semiconductor device 1.

As shown in FIG. 8, the switch 35 may perform the switching between the antenna 10 and the bandpass filter 7. As described above, the noise component which should be removed by the canceller 53 is the signal used in the semiconductor integrated circuit 2. The noise component is changed by a relationship (relationship of a degree of coupling) between a point at which the internal signal is generated and an interference point at which the internal signal is superimposed on the desired wave of the FM reception signal. Accordingly, the weighting factor of the canceller is changed according to the relationship of the degree of coupling.

The place where the switch 35 is disposed may be determined according to the degree of coupling. The configuration of FIG. 7 is effectively used in cases where the noise which is coupled in the semiconductor integrated circuit 2 is dominant. On the other hand, the configuration of FIG. 8 is effectively used in cases where the noise component which leaks from the signal terminal of the semiconductor integrated circuit 2 to the outside of the semiconductor integrated circuit 2 is coupled in the package substrate on which the semiconductor integrated circuit 2 is mounted.

The configurations of FIGS. 7 and 8 can also be applied to the configuration of FIG. 6. That is, the switch 35 may be provided in the configuration of FIG. 6.

Third Embodiment

A semiconductor integrated circuit device according to a third embodiment of the invention will be described below. The third embodiment relates to timing in which the weighting factor is determined in the first and second embodiments. Only the point which is different from those of the first and second embodiments will be described below.

FIG. 9 is a block diagram showing a semiconductor device of the third embodiment. As shown in FIG. 9, in the semiconductor device 1 of the third embodiment, a monitoring unit 36 is provided in addition to the configuration of the second embodiment of FIG. 7. Because other configurations are similar to those of the second embodiment of FIG. 7, the description is omitted.

The monitoring unit 36 monitors operating modes of the first signal processing module 22 and second signal processing module 23. When the operating mode of at least one of the first signal processing module 22 and second signal processing module 23 is changed, the monitoring unit 36 issues a command for determining the weighting factor to the factor determination unit 34.

Figure 10:
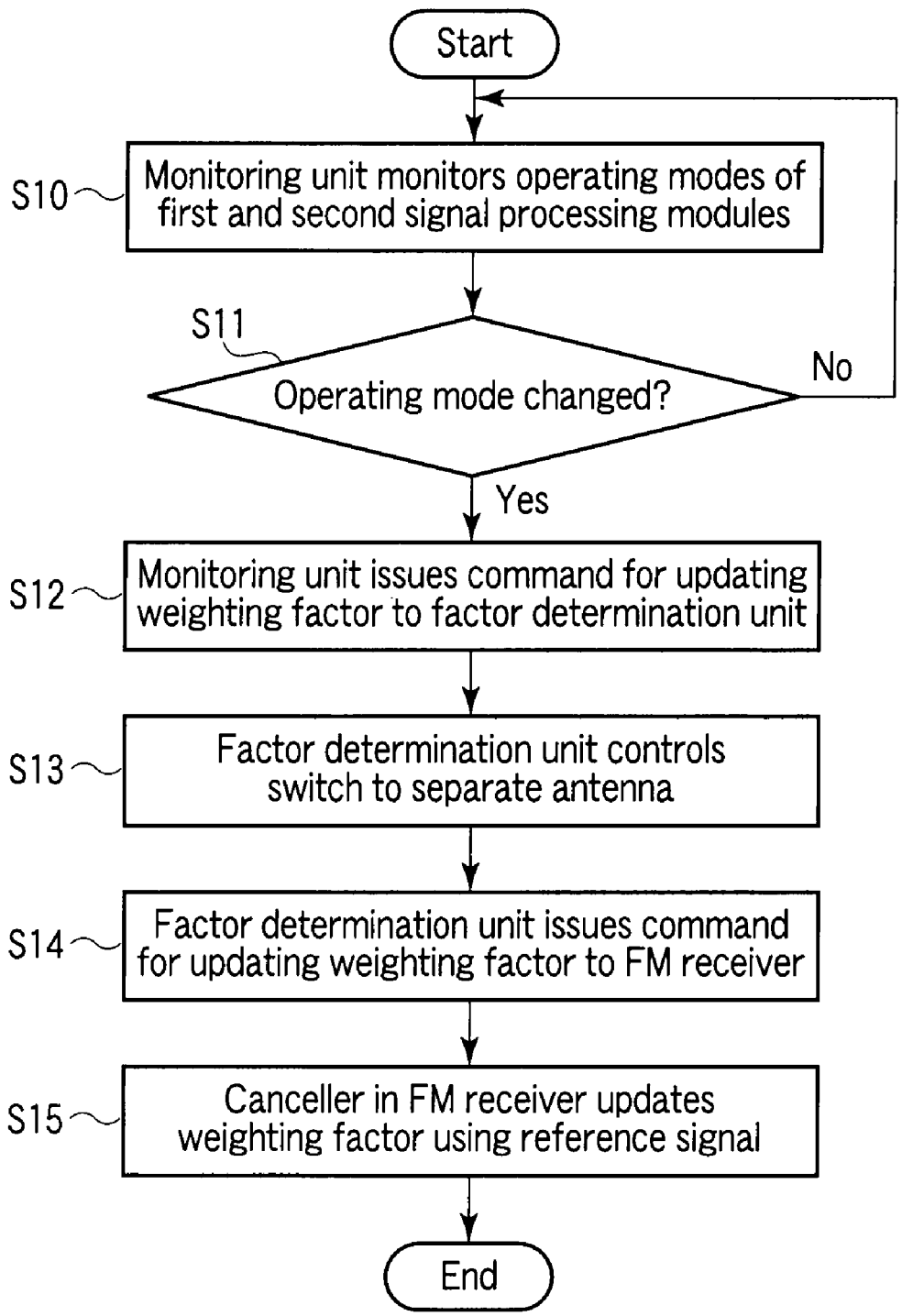
FIG. 10 is a flowchart showing an operation of a semiconductor integrated circuit of the third embodiment.

The operations of the monitoring unit 36, the factor determination unit 34, the switch 35, and the canceller 53 of the FM receiver 24 will be described with reference to FIG. 10. FIG. 10 is a flowchart showing the operation in determining the weighting factor.

As shown in FIG. 10, the monitoring unit 36 monitors the operation modes of the first signal processing module 22 and second signal processing module 23 (Step S10). The monitoring target may include other units, such as the processor 21, which exist in the semiconductor integrated circuit 2.

When detecting the change of the operating mode in one of the units, the monitoring unit 36 issues a command for updating the weighting factor to the factor determination unit 34 (Step S12).

Then, as described in the second embodiment, the factor determination unit 34 controls the switch 35 to separate the antenna 10 (bandpass filter 7) from the RF receiving unit 26 (Step S13). The factor determination unit 34 issues a command for updating the weighting factor to the canceller 53 of the FM receiver 24 (Step S14). In response to the command in Step S14, the canceller 53 updates the weighting factor such that the weighting factor becomes an optimum value (Step S15).

In the semiconductor integrated circuit of the third embodiment, the following effect (3) is obtained in addition to the effects (1) and (2) of first and second embodiments.

(3) The noise can efficiently be cancelled.

As described in the second embodiment, the noise component which is superimposed on the FM signal and radiated by an SoC is changed according to the relationship between the point at which the internal signal is generated in the SoC and the interference point at which the internal signal is superimposed on the desired wave of the FM signal.

In the configuration of the third embodiment, the monitoring unit 36 monitors the inside of the SoC, and updates the weighting factor in the canceller 53 when the operating mode is changed in the SoC. In other words, the weighting factor is updated only in cases where the relationship of the degree of coupling is changed. This is because, depending on the SoC, the update of the weighting factor is necessary only in cases where the relationship of the degree of coupling is changed.

Thus, the noise can efficiently be cancelled by restricting the weighting factor update timing to the timing of changing the internal operating mode. The weighting control unit 61 of the canceller 53 is operated only in cases where the internal operating mode of the SoC is changed, so that the signal processing for controlling the weighting can be simplified.

As used herein, "internal operating mode of the SoC is changed" means that the operation of the signal processing function in the SoC is partially started or stopped. More specifically, for example, in the wireless LAN function (first signal module 22) of FIG. 9, "internal operating mode of the SoC is changed" includes:

the signal processing function of the wireless LAN is turned on or off, the RF channel used is changed, and the internal operating mode is transferred to an intermittent receiving mode or a continuous receiving mode.

On the other hand, in the mobile telephone function (second signal processing module 23), "internal operating mode of the SoC is changed" includes:

the telephone function is turned on or off, the internal operating mode is transferred to a standby mode or the continuous receiving mode, and the internal operating mode is transferred to a reception and reproduction mode of a video image packet.

However, the change of the internal operating mode is not limited to the above-described examples, but may include any event as long as the event has an influence on the degree of coupling.

In the third embodiment, the monitoring unit 36 is provided in the configuration of FIG. 7. Alternatively, the monitoring unit 36 may be provided in the configurations of FIGS. 1 and 6 in the first embodiment. In such cases, as described above, the processing for updating the weighting factor is performed with the blind algorithm while the target reception signal is input. The monitoring unit 36 may be provided in the configuration of FIG. 8 in the second embodiment. The operation of the monitoring unit 36 may be performed by the processor 21 instead of providing the monitoring unit 36.

Thus, each of the semiconductor integrated circuits 2 of the first to third embodiments includes the clock generation unit 20, the signal processing units 22 and 23, the FM receiver 24, the processor 21, and the bus 25, which are formed on the same semiconductor substrate. The clock generation unit 20 generates the clock. The signal processing units 22 and 23 are operated in synchronization with the clock generated by the clock generation unit 20, and transmit and receive data by the wireless communication. The FM receiver 24 is operated in synchronization with the clock generated by the clock generation unit 20, and receives the FM signal. The processor 21 is operated in synchronization with the clock generated by the clock generation unit 20, and controls the operations of the signal processing units 22 and 23 and FM receiver 24. The bus 25 connects the signal processing units 22 and 23, the FM receiver 24, and the processor 21 so as to be able to conduct the data communication.

The FM receiver 24 includes the RF unit 26, the canceller 53, and the wave detector 54. The RF unit 26 performs the frequency conversion to the received FM signal using the clock generated by the clock generation unit 20 as the base signal. The canceller 53 produces the replica of the noise to cancel the noise superimposed on the FM signal using the reference signal. The reference signal is obtained by performing the frequency conversion to at least one of the signals in the signal processing units 22 and 23 and bus 25 using the clock generated by the clock generation unit 20 as the base signal. The wave detector 54 detects the FM signal in which the noise is cancelled in the canceller 53. That is, the frequency conversion is performed to the reference signal of the canceller 53 using the signal which is coherent to the base signal used in downconverting the received FM broadcast.

Accordingly, in an SoC provided with the FM receiver and the wireless transceiver for the plural wireless systems such as the wireless LAN, in cases where the frequency component used in the SoC or a higher harmonic wave of the frequency component overlaps the frequency of the FM broadcast, the interruption of the reception of the FM broadcast can be prevented. Therefore, the FM broadcast receiving characteristic can be improved in the highly-functional wireless signal processing SoC to prevent the deterioration of the reception performance of the specific FM broadcast depending on the frequency used in the SoC.

The canceller 53 includes the replica generation units 60-1 to 60-3, the weighting control unit 61, and the mixer 62. Each of the replica generation units 60-1 to 60-3 produces the replica of the noise. The weighting control unit 61 determines the weighting factors in the replica generation units 60-1 to 60-3 such that the noise superimposed on the FM signal is reproduced in the replica generation units 60-1 to 60-3. The mixer 62 removes the replicas produced by the replica generation units 60-1 to 60-3 from the FM signal.

Each of the replica generation units 60-1 to 60-3 includes the input unit 63, the plural delay circuits 68-1 to 68-*n*, the mixers 70-1 to 70-*n*, and the adder 62. Using the clock generated by the clock generation unit 20 as the base signal, the input unit 63 performs the frequency conversion to at least one of the signals of the signal processing units 22 and 23 and bus 25 to obtain the reference signal. The delay circuits 68-1 to 68-*n* delay the reference signal. The mixers 70-1 to 70-*n* perform the weighting to the outputs of the delay circuits 68-1 to 68-*n* based on the weighting factors determined by the weighting control unit 61. The adder 62 adds the outputs of the mixers 70-1 to 70-*n*, and supplies the addition result as the replica.

Additionally, the configuration of the second embodiment further includes the switch 35 and the timing control unit 34. The switch 35 performs the switching between the RF unit 26 and the antenna 10. The antenna 10 receives the FM signal, and supplies the received FM signal to the RF unit 26. The timing control unit 34 controls the switch 35 and the weighting control unit 61 such that the weighting factor is determined while the switch 35 releases the connection between the RF unit 26 and the antenna 10.

In the configuration of the second embodiment, the FM signal component can be eliminated. Accordingly, the output signal of the canceller 53 becomes (unnecessary wave component−replica component), and the signal processing for computing the weighting factor of the canceller can easily be simplified.

In the third embodiment, the weighting control unit 61 updates the weighting factor when the operating mode is changed in the signal processing units 22 and 23.

In the configuration of the third embodiment, the weighting factor of the canceller can be updated only in cases where the coupling relationship between the point at which the internal signal is generated in the SoC and the interference point at which the internal signal is superimposed on the desired wave of the FM signal is changed. Accordingly, the signal processing for controlling the weighting can be simplified.

In the embodiments, the wireless LAN function and the mobile telephone function have been described as the function possessed by the function module. The function possessed by the function module is not limited to the wireless LAN function and the mobile telephone function, but the embodiments can widely be applied to the configuration in which the plural function modules and the FM receiver are formed in the LSI.

The reference signal used in the canceller 53 is not limited to the control signal used in the function module (first and second signal processing modules 22 and 23) and the signal transmitted through the bus 25, but any signal may be used as the reference signal as long as the signal is used in the SoC 2. For example, the signal used in the processor 21 or RF receiving unit 26 may be used as the reference signal. However, the control signal used in the function module is usually operated at various frequencies. At this point, the control signal operated at higher frequency is preferably used, and which control signal is used as reference signal can appropriately be selected.

In the configurations of FIGS. 7 to 9, the switches 35 may be provided between the RF receiving unit 26 and the bandpass filter 7 and between the bandpass filter 7 and the antenna 10. In such cases, the factor determination unit 34 appropriately selects one of the switches 35, and may turn off the selected switch 35.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit device comprising:
a clock generation unit which is formed on a semiconductor substrate and generates a clock;
a signal processing unit which is formed on the semiconductor substrate, and transmits and receives data by a wireless communication using a bandwidth of a first frequency, the signal processing unit operating in synchronization with the clock generated by the clock generation unit;
an FM receiving unit which is formed on the semiconductor substrate and receives an FM signal, the FM receiving unit operating in synchronization with the clock generated by the clock generation unit;
a processor which is formed on the semiconductor substrate and controls the signal processing unit and the FM receiving unit, the processor operating in synchronization with the clock generated by the clock generation unit; and
a bus which is formed on the semiconductor substrate and connects the clock generation unit, the signal processing unit, the FM receiving unit, and the processor,
the FM receiving unit including:
an RF unit which performs frequency conversion of the received FM signal based on the clock generated by the clock generation unit;
a canceller which produces a replica of a noise based on a reference signal to cancel the noise on the frequency-converted FM signal, the reference signal being obtained by performing frequency conversion of a signal in at least one of the signal processing unit and the bus based on the clock generated by the clock generation unit, the clock having a second frequency which is integer multiple of the first frequency, the noise superimposed on the FM signal being due to the clock; and
a wave detector which detects the frequency-converted FM signal in which the noise is cancelled.

2. The device according to claim 1, wherein the canceller includes:
    a plurality of replica generation units each of which produces the replica of the noise;
    a weighting control unit which determines a weighting factor in the replica generation unit to reproduce the noise superimposed on the FM signal; and
    a first mixer which removes the replica produced by the replica generation unit from the frequency-converted FM signal on which the noise is superimposed.

3. The device according to claim 2, wherein each of the replica generation units includes:
    an input unit which frequency-converts, based on the clock generated by the clock generation unit, the signal in at least one of the signal processing unit and the bus to obtain the reference signal;
    a plurality of delay circuits which delay the reference signal;
    a second mixer which performs weighting to outputs of the delay circuits based on the weighting factor determined by the weighting control unit; and
    an adder which adds outputs of the mixers to supply an addition result as the replica.

4. The device according to claim 3, wherein the reference signal obtained by the frequency conversion in the input unit and the frequency-converted FM signal obtained in the RF unit are coherent to each other.

5. The device according to claim 2, further comprising:
    a switch which performs switching between the RF unit and an antenna, the antenna receiving the FM signal and supplying the received FM signal to the RF unit; and
    a timing control unit which controls the switch and the weighting control unit such that the weighting factor is determined while the switch releases connection between the RF unit and the antenna.

6. The device according to claim 2, further comprising a timing control unit which controls a switch and the weighting control unit such that the weighting factor is determined while the switch releases connection between the RF unit and the antenna, the antenna receiving the FM signal and supplying the received FM signal to the RF unit.

7. The device according to claim 2, wherein the weighting control unit updates the weighting factor when an operating mode is changed in the signal processing unit.

8. The device according to claim 7, wherein the signal processing unit includes a wireless LAN function, and
    the change of the operating mode includes a change of on/off of a signal processing function of a wireless LAN, a change of a communication channel used, and a change of intermittent/continuous receiving operation.

9. The device according to claim 7, wherein the signal processing unit includes a mobile telephone function, and
    the change of the operating mode includes a change of on/off of a telephone function, a change of standby/continuous receiving operation, and a change to a reception and reproduction operation of a video image packet.

10. The device according to claim 2, wherein the weighting control unit updates the weighting factor in changing a relationship of a degree of coupling between a point at which a noise is generated in the semiconductor integrated circuit device and an interference point at which the noise is superimposed on the FM signal.

11. The device according to claim 1, wherein the signal processing unit includes one of a wireless LAN function and a mobile telephone function.

12. The device according to claim 1, wherein a frequency of the clock and operating frequencies of the processor and bus are multiplied by 20 MHz.

13. A semiconductor integrated circuit device comprising:
    a signal processing unit which is formed on a semiconductor substrate and transmits and receives data by wireless communication; and
    an FM receiving unit which is formed on the semiconductor substrate and receives an FM signal; and
    a bus which is formed on the semiconductor substrate and connects the signal processing unit and the FM receiving unit,
    wherein the signal processing unit and the FM receiving unit operate in synchronization with a clock generated by a clock generator on the semiconductor substrate, and
    the FM receiving unit produces a replica of a noise, and cancels a noise superimposed on the FM signal using the replica, the replica being produced based on a signal in at least one of the signal processing unit and the bus.

14. The device according to claim 13, wherein the replica produced by the FM receiving unit is coherent to the noise.

15. The device according to claim 13, wherein the FM receiving unit produces the replica when the FM receiving unit is disconnected to an antenna for receiving the FM signal.

* * * * *